(12) United States Patent
Handy (10) Patent No.: US 10,604,354 B2
(45) Date of Patent: Mar. 31, 2020

(54) TREATMENT METHOD (71) Applicant: Keith David Handy, Stone (GB)

(72) Inventor: Keith David Handy, Stone (GB)

( * ) Notice: Subject to any disclaimer, the term of this patent is extended or adjusted under 35 U.S.C. 154(b) by 0 days.

(21) Appl. No.: 16/131,411

(22) Filed: Sep. 14, 2018

(65) Prior Publication Data

US 2019/0084773 A1 Mar. 21, 2019

(30) Foreign Application Priority Data

Sep. 15, 2017 (GB) .................................. 1714871.9

(51) Int. Cl.
*B65G 45/22* (2006.01)

(52) U.S. Cl.
CPC .................................. *B65G 45/22* (2013.01)

(58) Field of Classification Search
CPC ........ B65G 45/22; B65G 45/14; B08B 3/022; B08B 3/041
USPC ................................ 198/495, 498; 134/122 R
See application file for complete search history.

(56) References Cited

U.S. PATENT DOCUMENTS

| | | | | |
|---|---|---|---|---|
| 3,545,460 A * | 12/1970 | Daum | ....................... | B60S 3/04 134/123 |
| 4,777,972 A * | 10/1988 | Adam | ....................... | B08B 3/02 134/172 |
| 4,960,200 A | 10/1990 | Pierce | | |
| 5,189,936 A * | 3/1993 | Gerber | ................... | B26D 7/018 198/851 |
| 6,058,556 A * | 5/2000 | Jones | ........................ | B08B 5/02 134/122 R |
| 6,244,423 B1 * | 6/2001 | Tacchi | .................... | B08B 3/022 198/493 |
| 7,077,260 B2 * | 7/2006 | Saballus | ................ | B65G 45/22 134/122 R |
| 7,784,476 B2 * | 8/2010 | Handy | .................... | B08B 1/008 134/129 |

(Continued)

FOREIGN PATENT DOCUMENTS

| CN | 102887350 A | 1/2013 |
|---|---|---|
| DE | 10108252 A1 | 8/2002 |
| WO | 2006034267 A2 | 3/2006 |

OTHER PUBLICATIONS

Great Britain Patent Application No. 1714871.9, International Search Report, dated Feb. 18, 2019, 4 pages.

*Primary Examiner* — Mark A Deuble
(74) *Attorney, Agent, or Firm* — Han Santoos, PLLC; Elliott Y. Chen (57) ABSTRACT

A moving item may be treated using a treatment member. Data may be obtained that includes a width of the moving item, a maximum speed of movement for a treatment member across the moving item to provide a required level of treatment, a speed of movement of the moving item, and a length of the moving item. An extent of movement of the treatment member across the moving item in each reciprocal movement of the treatment member and a speed of reciprocal movement of the treatment member across the moving item may be calculated based at least on the data to provide a required level of treatment across the moving item. The treatment member is reciprocally moved in a required pattern across the moving item based at least on the calculated extent of movement and the calculated speed of movement to provide a full treatment coverage of the moving item.

20 Claims, 5 Drawing Sheets

(56) References Cited

U.S. PATENT DOCUMENTS

2003/0178048 A1\* 9/2003 Honkala ............... B08B 3/022
134/104.2

\* cited by examiner

TREATMENT METHOD

CROSS-REFERENCE TO RELATED PATENT APPLICATION

This patent application claims priority to Great Britain Patent Application No. 1714871.9, filed Sep. 15, 2017, and entitled "Treatment Method," which is hereby incorporated by reference in its entirety.

TECHNICAL FIELD

This invention concerns a method of treating a longitudinally moving item, apparatus for treating a longitudinally moving item, and particularly but not exclusively a method and apparatus for cleaning a continuous moving item such as a conveyor belt.

BACKGROUND

Conveyor belts and other moving items can be cleaned by a transversely moving cleaning head spraying a fluid such as water or steam onto the belt. When cleaning a conveyor, it is often not possible to clean the whole width of the conveyor in a single transverse movement of the cleaning head. Accordingly, it is necessary to sequentially clean across the conveyer.

DETAILED DESCRIPTION

Figure 1:
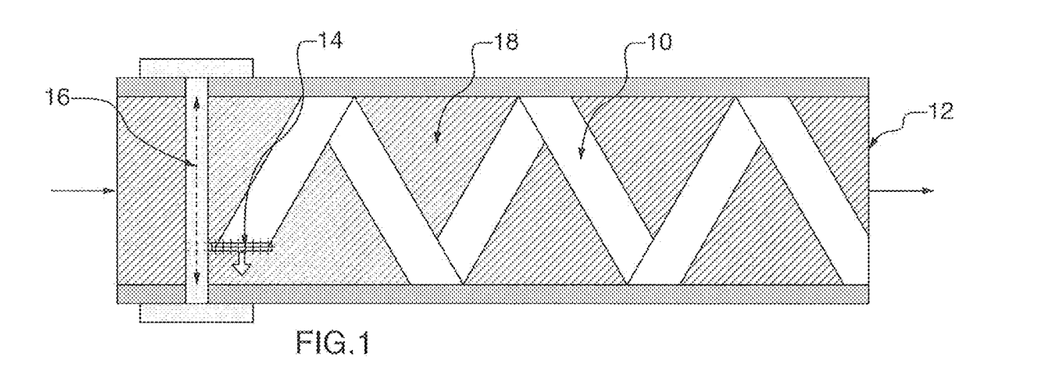
FIG. 1 shows areas cleaned following a first pass of a belt under a moving cleaning head, according to a first prior way of cleaning a conveyor belt.
Figure 2:
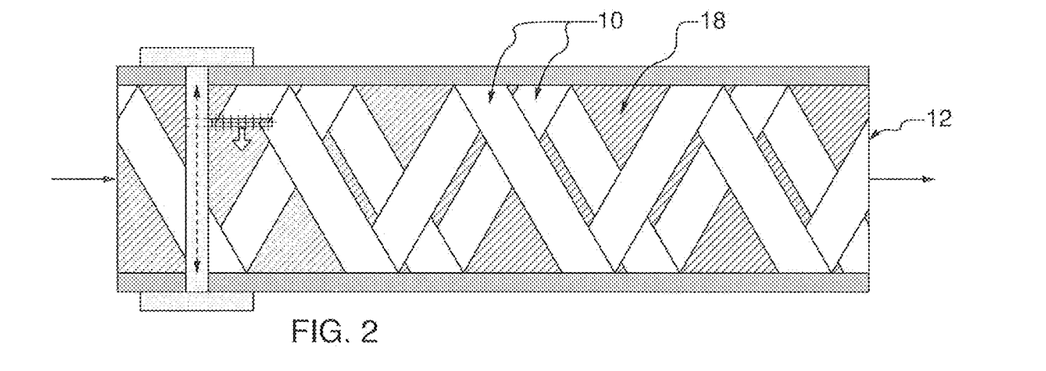
FIG. 2 shows the cleaned areas following a second pass of the belt under the moving cleaning head, according to the first prior way of cleaning a conveyor belt.
Figure 3:
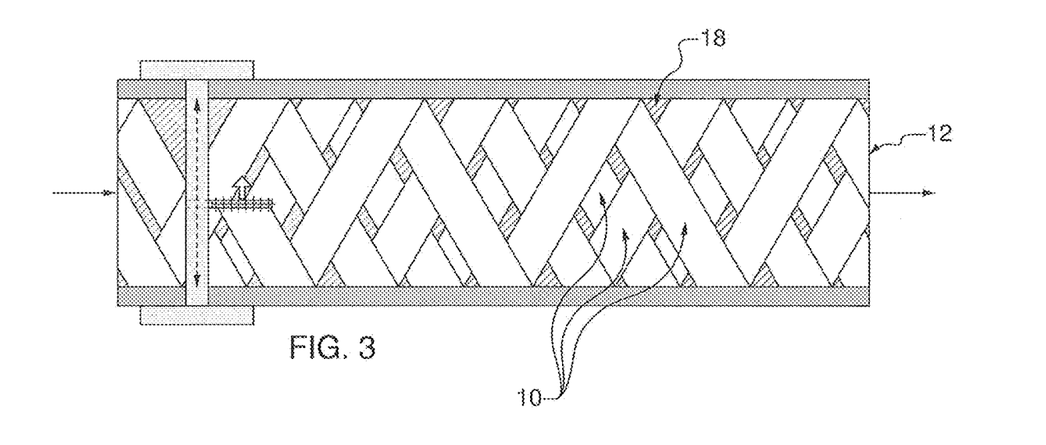
FIG. 3 shows the cleaned areas following a third pass of the belt under the moving cleaning head, according to the first prior way of cleaning a conveyor belt.

FIGS. 1 to 3 show the cleaning area 10 achieved on a moving conveyor belt 12, with a cleaning head 14 moving transversely along a frame 16 extending over the conveyor belt 12, with the head 14 moving across the whole width of the belt 12. FIG. 1 shows the area 10 cleaned following a first pass of the belt 12 under the moving cleaning head 14. FIG. 2 shows the cleaned areas 10 following a second pass of the belt 12 under the moving cleaning head 14. FIG. 3 shows the same situation after a third pass of the belt 12 under the moving cleaning head 14. As can be seen uncleaned areas 18 are still left on the belt 12.

Figure 4:
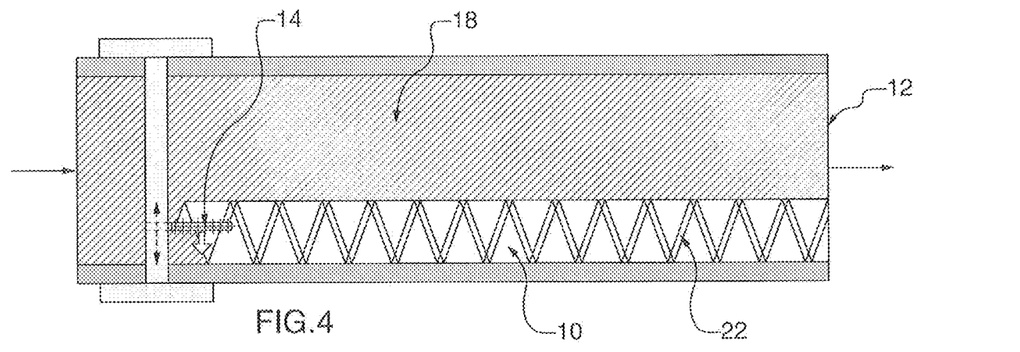
FIG. 4 shows areas cleaned following a first pass of a belt under a moving cleaning head, according to a second prior way of cleaning a conveyor belt.
Figure 5:
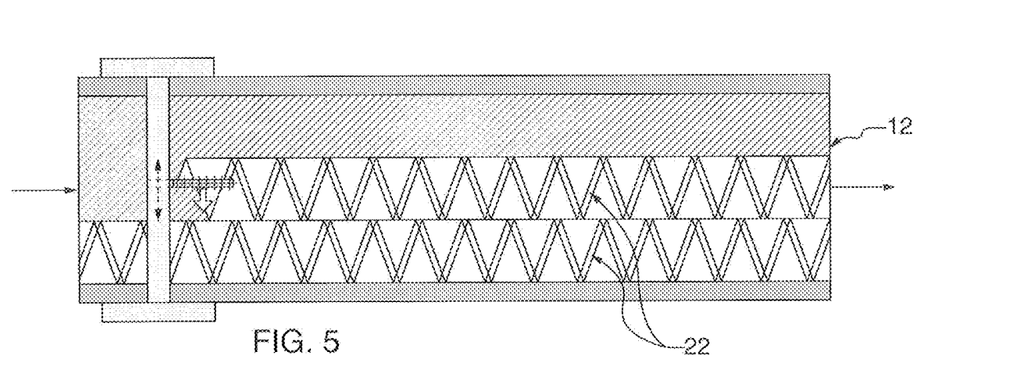
FIG. 5 shows the cleaned areas following a second pass of the belt under the moving cleaning head, according to the second prior way of cleaning a conveyor belt.
Figure 6:
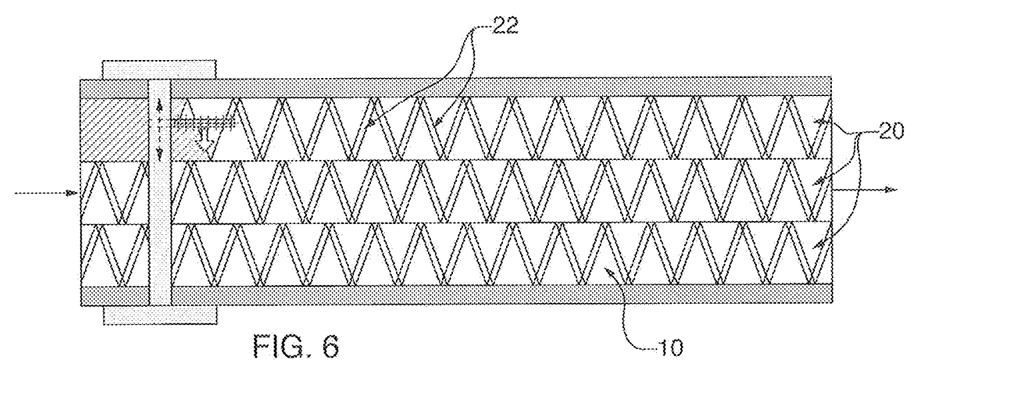
FIG. 6 shows the cleaned areas following a third pass of the belt under the moving cleaning head, according to the second prior way of cleaning a conveyor belt.

FIGS. 4 to 6 show an arrangement where the cleaning head 14 is caused to clean the belt 12 in three separate bands 20 across the width of the belt 12, where the head 14 only moves respectively across the width of each band 20. In practice it is very difficult to estimate quite how this should be achieved, and as shown whilst full coverage of the belt 12 has been achieved, a significant overlapping area 22 is provided which has been cleaned twice.

According to a first aspect of the invention there is provided a method of treating a longitudinally moving item by reciprocally moving a treatment member across the moving item in a required pattern to provide full coverage over the moving item; the method comprising inputting the width of the moving item; inputting the maximum speed of movement of the treatment member across the movable item to provide a required level of treatment; inputting the speed of movement of the moving item; inputting the length of the moving item; and automatically calculating the extent of movement of the treatment member across the moving item in each reciprocal movement of the treatment member, and calculating the required speed of movement of the treatment member across the moving item, to provide a required level of treatment across the whole of the moving item.

The method may comprise calculating the extent of one or more phases of reciprocal movement of the treatment member across part or whole of the width of the moving item, such that each phase is of the same extent of movement across the moving item.

The method may include calculating the speed of reciprocal movement in the light of the input of the maximum speed of movement of the treatment member across the moving item to provide a required level of treatment. The method may include providing the slowest possible speed of movement of the treatment member across the moving item relative to the number of phases of reciprocal movement and the speed of movement of the moving item; so as to provide as thorough treatment as possible.

The method may include calculating the time for treating the whole of the moving item.

The method may include inputting the width of the moving item by first locating the treatment member at one side of the moving item and noting the position of the treatment member, and then locating the treatment member at the other side of the moving item and noting the position of the treatment member.

The moving item may be in the form of a continuous member, and may comprise a conveyor belt.

The method may include inputting the length of the continuous member.

The method may include measuring the length of the continuous member.

The method may include measuring the speed of movement of the continuous member.

The method may include moving the treatment member to a location clear of the moving item once the whole of the moving item has been treated.

The invention further provides a method of cleaning a moving item, the method being according to any of the preceding ten paragraphs, with the treatment member being in the form of a cleaning head.

According to a still further aspect of the invention there is provided apparatus for treating a moving item, the apparatus being configured to apply a method according to any of the preceding eleven paragraphs.

The apparatus may be configured to automatically calculate the extent of movement of the treatment member across the moving item in each reciprocal path.

The apparatus may be configured to automatically calculate the speed of movement of the treatment member across the moving item.

The apparatus may be configured to automatically calculate the number of phases of reciprocal movement of the treatment member across the moving item, to provide treatment across the whole of the moving item.

The treatment member may be in the form of a cleaning head which sprays fluid onto an item being cleaned.

The apparatus may include a frame mountable to extend across a moving item, with the treatment member movably mounted on the frame. The frame may be adjustable for use with different widths of moving item. The apparatus may be portable such that it can be moved between different moving items.

The apparatus may be programmable. The apparatus may include a memory to store data concerning movement of the treatment member for a particular moving item.

The apparatus may detect the speed of movement of a moving item. The apparatus may include a wheel engageable with the moving item to detect the speed of movement thereof.

An embodiment of the present invention will now be described by way of example only and with reference to the accompanying drawings, in which:—

Figure 7:
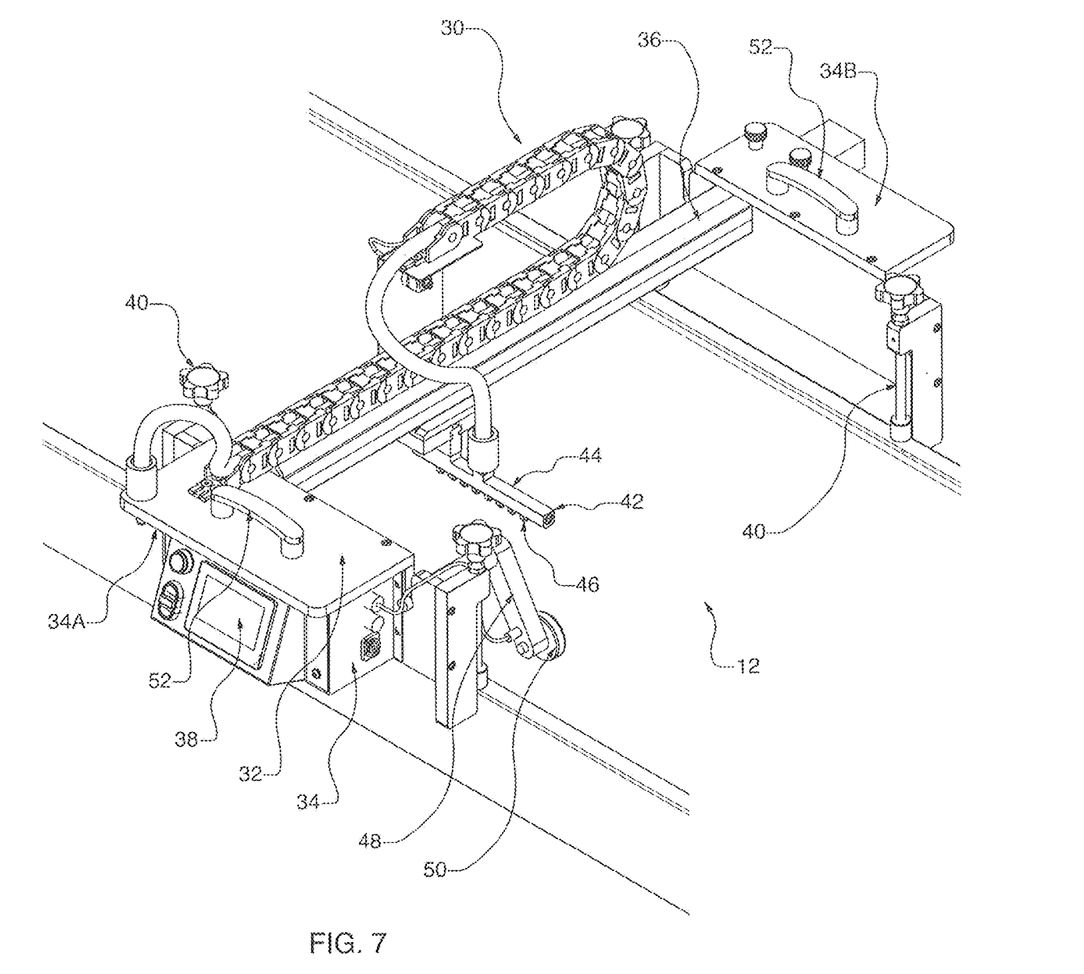
FIG. 7 is a diagrammatic perspective view of an apparatus according to the invention for cleaning a conveyor belt.
Figure 8:
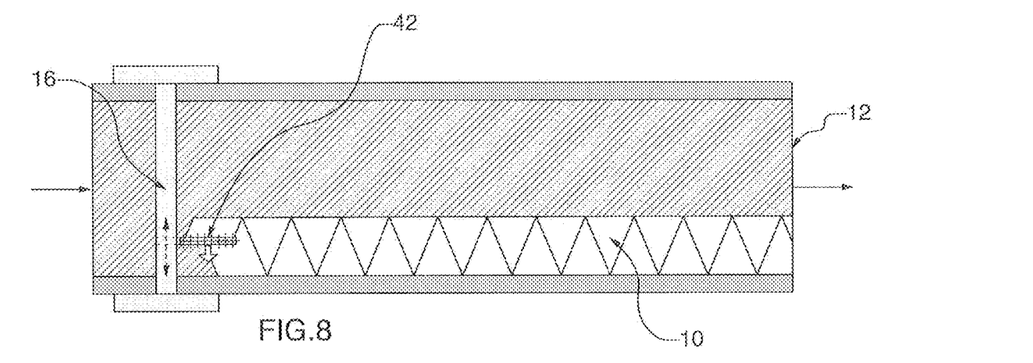
FIG. 8 shows areas cleaned following a first pass of the apparatus according to the invention for cleaning a conveyor belt.
Figure 9:
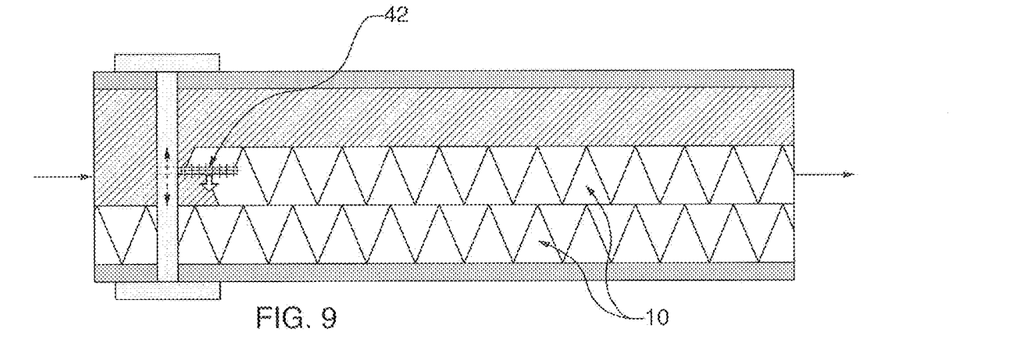
FIG. 9 shows areas cleaned following a second pass of the apparatus according to the invention for cleaning a conveyor belt.
Figure 10:
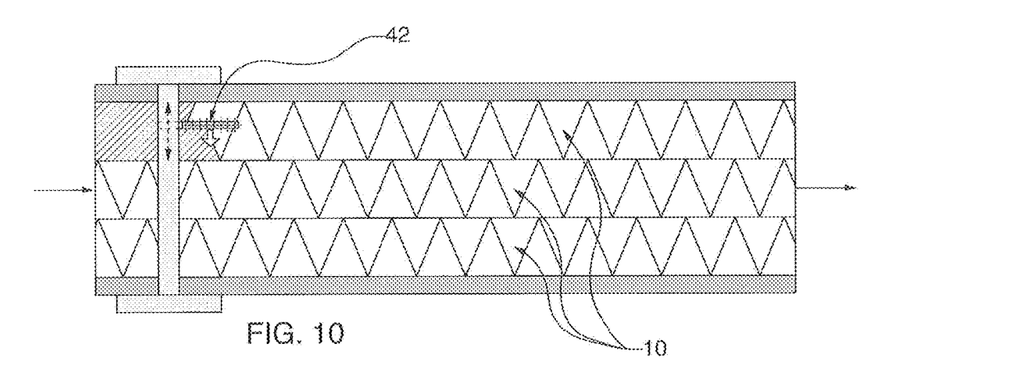
FIG. 10 shows areas cleaned following a third pass of the apparatus according to the invention for cleaning a conveyor belt.
Figure 11:
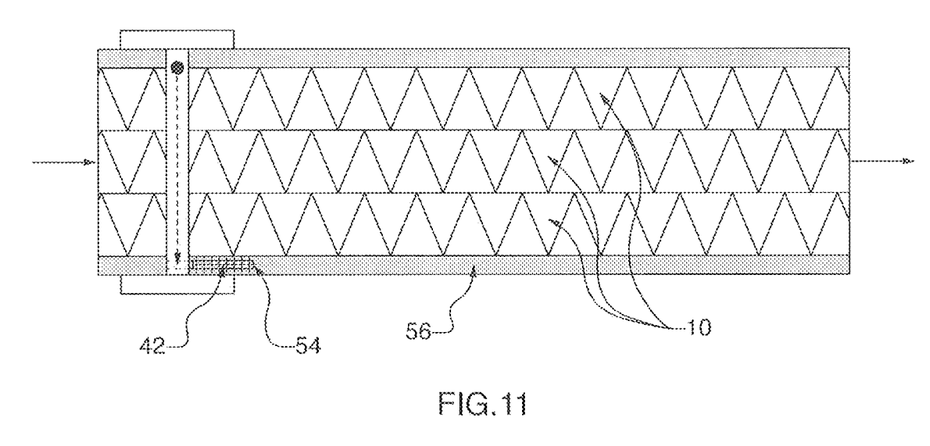
FIG. 11 shows areas cleaned following a third pass of the apparatus according to the invention for cleaning a conveyor belt, in which the apparatus is in a further position.

FIGS. 1 to 3 are sequential diagrammatic plan views of one prior way of cleaning a conveyor belt;

FIGS. 4 to 6 are similar views to FIGS. 1 to 3 but of a further prior method of cleaning a conveyor belt;

FIG. 7 is a diagrammatic perspective view of apparatus according to the invention for cleaning a conveyor belt;

FIGS. 8 to 10 are similar views to FIGS. 1 to 3 but of the apparatus of FIG. 7 in use; and FIG. 11 is a similar view to FIG. 10 but showing the apparatus in a further position.

FIG. 7 shows a cleaning apparatus 30 for cleaning a conveyor belt 12 as shown. The apparatus 30 comprises a frame 32 with side members 34 and a transverse member 36 extending between the side members 34. A control panel 38 is provided on a first of the side members 34A, whilst the second side member 34B adjustably mounts the transverse member 36, such that the spacing between the side members 34 can be varied for use with different widths of conveyor. Support arrangements 40 are provided on the side members 34 to enable mounting of the apparatus 30 on the sides of the conveyor belt 12. The support arrangements 40 also permit the apparatus 30 to be removed from the belt 12 for use for instance on another belt, or for storage when cleaning is not in progress.

A treatment member in the form of a cleaning head 42 is slidably mounted on the transverse member 36. The cleaning head 42 includes a manifold 44 extending parallel to the belt 12, with a plurality of jets 46 provided on the underside of the manifold 44 for providing cleaning by spraying a fluid such as water, a cleaning liquid, or steam onto the belt 12. The cleaning head 42 can be moved reciprocally along the transverse member 36 as required by any appropriate means.

The control panel 38 enables the amount and speed of transverse movement of the cleaning head 42 to be controlled.

A belt speed measurement arrangement 48 is provided including a wheel 50 engageable against the belt 12, with the speed of rotation of the wheel 50 being detected to provide an indication of the speed and movement of the belt 12. The wheel speed measurement arrangement 48 may be arranged to be movable to an out of use condition once the speed of the belt 12 has been detected, and/or to be selectively removable from the respective side member 34A.

Operation of the apparatus to clean the belt will now be described. The apparatus 30 is located on a belt 12 using handles 52 provided on the side members 34, and the support arrangements 40 are secured. The apparatus 30 can then be turned on using the control panel 38, and either a cleaning program from a memory within the control panel 38 is used, or the apparatus 30 is used to produce a cleaning program as follows.

The cleaning head 42 is moved using the control panel 38 to one edge of the belt 12 and the position is noted in software in the control panel 38. The cleaning head 42 is then moved using the control panel 38 to the other side of the belt 12, and this position is also detected. This provides an indication of the width of the belt 12, and also the outer extent of movement of movement of the cleaning head 42.

The debris level and hence maximum transverse speed of movement of the cleaning head 42 to provide thorough cleaning is determined, and this may be achieved by experimental cleaning at different speeds of movement of the cleaning head 42, which can be controlled during set up using the control panel 38.

A figure for the debris level on the belt 12 is then entered, for instance on a scale of 1 to 20, where 20 is the maximum traverse speed available to remove debris. This level determines the maximum transverse speed of movement of the cleaning head 42, whilst still providing adequate cleaning of the belt 12.

The speed of movement of the belt 12 can then be entered. If this figure is known this can be entered by typing in the speed on the control panel 38. Alternatively, the belt speed can be measured by the belt speed measuring arrangement 48. The belt 12 is taken up to speed, and its speed is measured once the belt speed has settled down following initial actuation.

The cycle time, i.e. time for the belt 12 to complete one whole longitudinal pass is entered. The length of the belt 12 is entered, or can be calculated knowing the speed and time for a single complete pass of the whole belt 12. The apparatus 30 will then automatically pick a program for cleaning of the belt 12 within a minimum possible time. The apparatus 30 will choose the number of transverse strips of the belt 12 which require to be cleaned bearing in mind the width of the belt 12 and the maximum speed of movement of the cleaning head 42 subject to the debris level which has been input. Once the apparatus 30 has decided how many strips the belt 12 is to be cleaned in, i.e. the number of phases of cleaning across the belt 12, then the optimum speed of transverse movement of the cleaning head 42 will be chosen to provide complete coverage of the belt substantially without overlap, as illustrated in FIGS. 8-10. This may mean that a lower transverse speed is applied than the maximum for that debris level, which will potentially mean a more thorough cleaning of the belt 12 will be achieved.

A park setting may be provided such that once a cleaning operation has been completed, the cleaning head 42 is moved clear of the belt 12 to a park position 54, such that the belt 12 can be used normally without any interference from the cleaning head 42. Such a park position 54 is illustrated in FIG. 11, where the cleaning head 42 is moved to lie above the surround 56 adjacent the conveyor belt 12. This may be required if the cleaning apparatus 30 is to remain on the belt assembly during normal use of the conveyor.

It is to be realised that the apparatus can be used on a wide range of belts, and a cleaning program calculated can be stored with an appropriate identification for each belt such that the program can be repeated when the apparatus is again located on a respective belt. The apparatus therefore provides for optimum cleaning in different scenarios without any substantial input from an operative. The apparatus can also allow cleaning programs to be stored and reused when the apparatus is perhaps relocated on a respective belt.

The apparatus may be used in a range of other applications beyond cleaning conveyor belts. The apparatus could be used for sterilisation. The apparatus could be used for cleaning or otherwise treating for instance trays used perhaps in food production which could be reciprocally moved beneath the apparatus.

A different type of cleaning head could be used. The cleaning head could for example be mounted to for instance a robot arm rather than on a frame as indicated. In such an instance, the cleaning head would probably not follow a strictly transverse path across the item being cleaned, and this can be calculated in the optimum cleaning program worked out.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of treating a moving item, the method comprising:
    obtaining data that includes a width of the moving item, a maximum speed of movement for a treatment member across the moving item to provide a required level of treatment, a speed of movement of the moving item, and a length of the moving item;
    automatically calculating an extent of movement of the treatment member across the moving item in each reciprocal movement of the treatment member, and calculating a speed of reciprocal movement of the treatment member across the moving item based at least on the data to provide a required level of treatment across a whole of the moving item; and
    reciprocally moving the treatment member in a required pattern across the moving item based at least on the calculated extent of movement and the calculated speed of reciprocal movement to provide a full treatment coverage of the moving item.

2. The method according to claim 1, wherein the calculating the extent of movement includes calculating a corresponding extent for each of one or more phases of reciprocal movement of the treatment member across a part or whole of the width of the moving item such that each phase has an identical extent of movement across the moving item.

3. The method according to claim 1, wherein the calculating the speed includes calculating the speed of the reciprocal movement according to an input of a maximum speed of movement of the treatment member across the moving item to provide the required level of treatment.

4. The method according to claim 1, further comprising providing a slowest possible speed of movement of the treatment member across the moving item relative to a number of phases of the reciprocal movement of the treatment member and the speed of movement of the moving item, so as to provide as thorough treatment as possible.

5. The method according to claim 1, further comprising calculating a time for treating the whole of the moving item.

6. The method according to claim 1, wherein the width of the moving item is obtained by first locating the treatment member at one side of the moving item and noting a first position of the treatment member, and then locating the treatment member at another side of the moving item and noting a second position of the treatment member.

7. The method according to claim 1, wherein the moving item is in a form of a continuous member.

8. The method according to claim 7, wherein the data includes a length of the continuous member.

9. The method according to any of claim 7, wherein obtaining the data includes measuring the length of the continuous member.

10. The method according to any of claim 7, wherein obtaining the data includes measuring the speed of movement of the continuous member.

11. An apparatus for treating a moving item, the apparatus comprising:
    a treatment member that moves across the moving item in a pattern to provide coverage over the moving item; and
    a control component that receives a width of the moving item, a maximum speed of movement of the treatment member across the moving item to provide a required level of treatment, a speed of movement of the moving item, and a length of the moving item, and automatically calculates an extent of movement of the treatment member across the moving item in each reciprocal movement of the treatment member, and calculates a speed of movement of the treatment member across the moving item to provide a required level of treatment across a whole of the moving item.

12. The apparatus according to claim 11, wherein the control component automatically calculates the extent of movement of the treatment member across the moving item in each reciprocal path.

13. The apparatus according to claim 11, wherein the control component automatically calculates the speed of movement of the treatment member across the moving item.

14. The apparatus according to claim 11, wherein the control component automatically calculates a number of phases of reciprocal movement of the treatment member across the moving item to provide treatment across the whole of the moving item.

15. The apparatus according to claim 11, wherein the treatment member includes a cleaning head which sprays fluid onto an item being cleaned.

16. The apparatus according to claim 11, further comprising a frame mountable to extend across the moving item, with the treatment member movably mounted on the frame.

17. The apparatus according to claim 11, wherein the control component is programmable.

18. The apparatus according to claim 11, wherein the control component includes a memory to store data concerning movement of the treatment member for a particular moving item.

19. The apparatus according to claim 11, further comprising a speed measurement arrangement that detects the speed of movement of the moving item.

20. The apparatus according to claim 19, wherein the speed measurement arrangement includes a wheel engageable with the moving item to detect the speed of movement of the moving item.

* * * * *